No. 810,825. PATENTED JAN. 23, 1906.
M. TURNER, W. KERNAGHAN & C. M. SWINEHART.
BRAKE.
APPLICATION FILED JUNE 1, 1905.
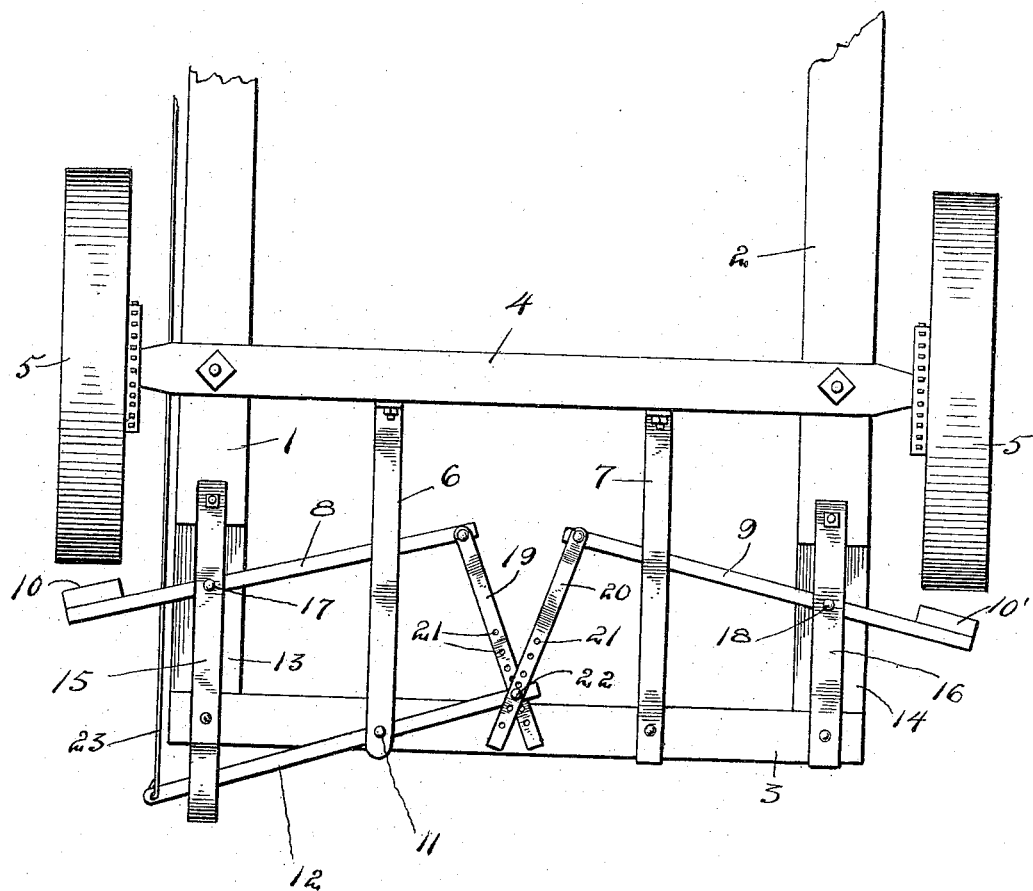

UNITED STATES PATENT OFFICE.

MILES TURNER, WILLIAM KERNAGHAN, AND CHARLES M. SWINEHART, OF STEAMBOAT SPRINGS, COLORADO.

BRAKE.

No. 810,825.     Specification of Letters Patent.     Patented Jan. 23, 1906.

Application filed June 1, 1905. Serial No. 263,213.

*To all whom it may concern:*

Be it known that we, MILES TURNER, WILLIAM KERNAGHAN, and CHARLES M. SWINEHART, citizens of the United States, residing at Steamboat Springs, in the county of Routt, State of Colorado, have invented certain new and useful Improvements in Brakes; and we do hereby declare the following to be a full, clear, and exact description of the invention, such as will enable others skilled in the art to which it appertains to make and use the same.

This invention relates to brakes, and more particularly to a means for braking vehicles.

One object of the invention is to provide a very simple, inexpensive, durable, and efficient brake capable of free and easy manipulation.

Another object of the invention resides in the provision of a brake designed to operate at the rear of the vehicle and which is so constructed to permit of its ready substitution for other forms of brakes.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the present invention.

The accompanying drawing illustrates an inverted plan view of the rear portion of a vehicle having an improved brake applied.

Referring now to the drawing, there is shown a portion of the frame of a threshing-machine including sills 1 and 2, connected at their rear ends by the cross-beam 3, the frame being provided with a supporting-axle 4, on which are mounted wheels 5. Longitudinal braces 6 and 7 are connected to the axle and to the cross-beam 3, and the bolt 11, that connects the brace 6 to the cross-beam, serves also as a pivot or fulcrum for a lever 12 for a purpose to be presently explained.

The under sides of the rear end portions of the sills are cut away, as illustrated at 13 and 14, and secured to the lower faces of the sills and to the cross-beam 3 are plates 15 and 16, between which and the cut-away portions of the sills are pivoted levers 8 and 9 on bolts 17 and 18, that pass through the sills and plate. The levers 8 and 9 are the brake levers or beams and are provided with shoes 10 and 10', respectively, which are positioned to engage the wheels 5 when the beams are correspondingly operated. Pivoted to the inner ends of the beams 8 and 9 are link-plates 19 and 20, each of which has a longitudinal series of perforations 21. The links extend rearwardly and are connected to the lever 12 by a pin 22, passed through the lever and which may be engaged with the proper perforation 21 of each link to swing the brake-shoes against the wheels when the lever 12 has its outer end moved forwardly. To shift the lever 12, a rod 23 is attached thereto and may be provided with any suitable means at its opposite end to reciprocate it. The plate 15 extends rearwardly beyond the sill 3 and is looped to form a guide for the lever 12.

What is claimed is—

The combination with a wheeled frame, comprising sills, a transverse beam at the rear end of the sills, and braces connected to the axle and transverse beam, said sills having their under faces cut away at their rear ends, of guide-plates secured to the under sides of the sills and to the transverse beam and bridging the cut-away portions, brake-beams pivoted between the sills and the guide-plates and provided with shoes disposed to engage the wheels at times, links pivoted to the brake-beams, a lever pivoted to the transverse beam and to the links, and means for shifting the lever.

In testimony whereof we affix our signatures in presence of two witnesses.

MILES TURNER.
    WILLIAM KERNAGHAN.
    CHARLES M. SWINEHART.

Witnesses:
    JOSHUA WALBRIDGE,
    DRUCILLA WALBRIDGE.